Jan. 9, 1940.                    LE ROY G. STORY                    2,186,275
                         CONVERSION OF HYDROCARBON GASES
                              Filed Sept. 12, 1936
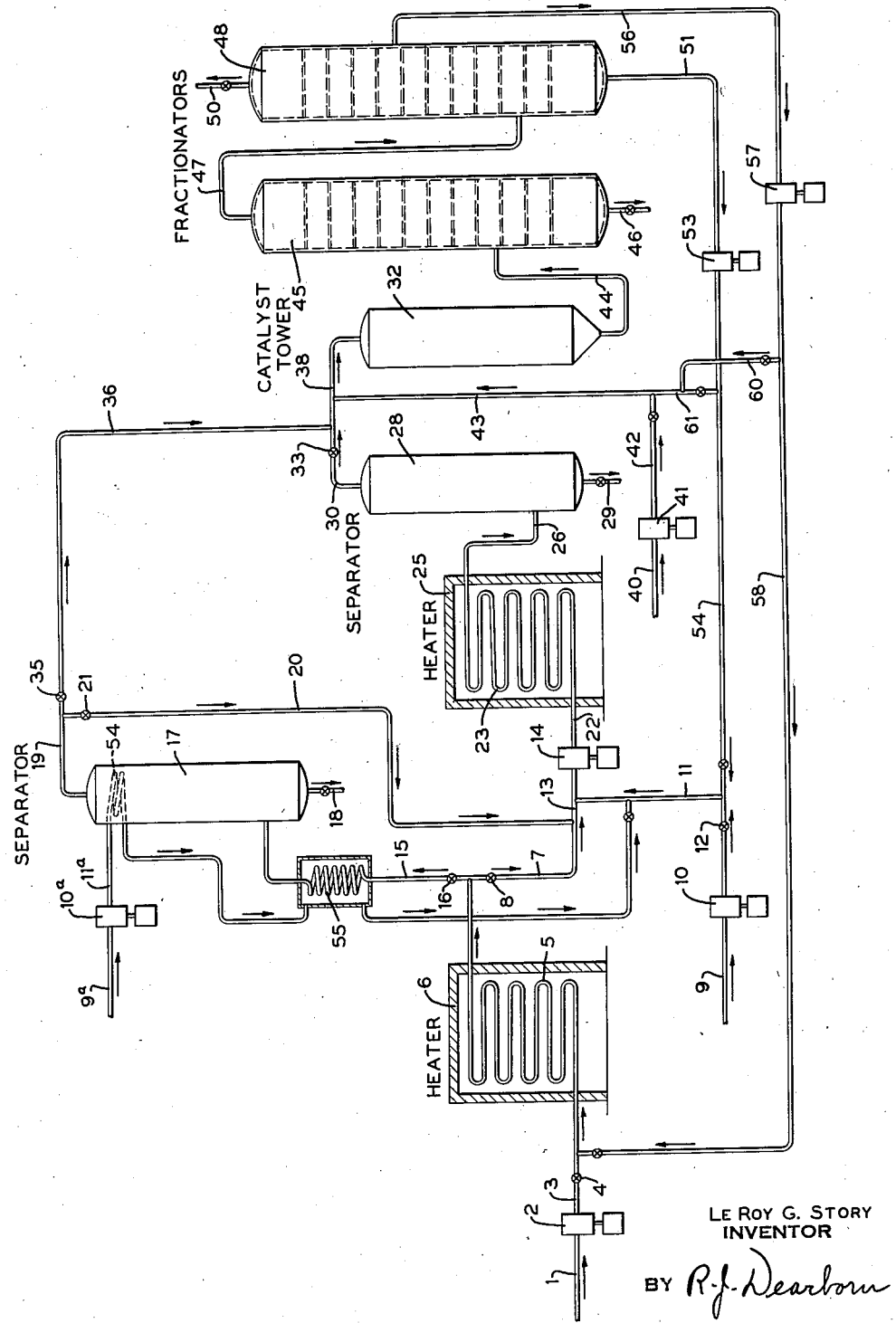
Le Roy G. Story
INVENTOR
BY R. J. Dearborn
ATTORNEY Patented Jan. 9, 1940

2,186,275

UNITED STATES PATENT OFFICE 2,186,275

CONVERSION OF HYDROCARBON GASES

Le Roy G. Story, Bronxville, N. Y., assignor to The Texas Company, New York, N. Y., a corporation of Delaware Application September 12, 1936, Serial No. 100,413

8 Claims. (Cl. 196—10)

This invention relates to the conversion of hydrocarbon gases and has to do particularly with a multi-stage process in which selected hydrocarbon fractions are treated under conditions for the optimum conversion thereof into normally liquid products.

Gas conversion operations have been developed which convert with various degrees of success substantially any of the hydrocarbons found in the gaseous hydrocarbons of petroleum origin to normally liquid products. Gas pyrolysis may be used to convert lower boiling paraffin hydrocarbons into normally liquid products essentially of aromatic character. The higher boiling paraffin hydrocarbons may be converted into liquid products essentially of aliphatic character by high pressure thermal polymerization. The olefins have been converted into liquid products of aliphatic composition by catalytic polymerization in the presence of a suitable catalyst. It is an object of the present invention to combine these various processes to obtain maximum yields of liquid products under optimum conditions for the efficient treatment of any of these types of hydrocarbon gases.

Gas pyrolysis, thermal polymerization and catalytic polymerization are conducted under successively lower temperature conditions. One convenient method of combining these operations is to conduct them in relation to each other so that the heat of the products from the higher temperature operation may be utilized for raising the temperature of a cooler charging stock adapted for a lower temperature conversion operation. The method of operation in which the various conversion steps are arranged in the order of successively lower temperatures, is furthermore advantageous because the products adapted for conversion at the lower temperatures are unsuitable for treatment at a higher conversion operation. Furthermore, it is advantageous to treat the products from a higher temperature conversion operation in one or more of the operations conducted at lower temperature because of the adaptability of certain of the reaction products of higher temperature conversion for treatment under a lower temperature conversion operation. For example, the products of a gas pyrolysis operation may advantageously be added to the charge to a thermal polymerization operation due to the promoting effect of certain components thereof on the polymerization of saturated hydrocarbons. Also in either gas pyrolysis or thermal polymerization operations there are produced olefinic materials which are suitable for treatment in a catalytic polymerization process. Moreover, by operating various gas conversion operations in combination, in which the products from one conversion operation are treated in another type of conversion step, an opportunity is provided for reactions in the nature of gas reversion to occur. And, by using the aforementioned gas conversion operations in combination, it is possible to conduct the recycle process, under which the exit gases may be fractionated and the selected fractions returned to that stage of polymerization which provides optimum conditions for the conversion thereof into the liquid products.

In accordance with the present invention, a lighter hydrocarbon gas suitable for gas pyrolysis, such as propane, gas stabilizer reflux, a fraction containing chiefly paraffins between methane and butane, or any hydrocarbon fraction containing a substantial amount of paraffins of a lower number of carbon atoms than butane, may be subjected to a gas pyrolysis operation under conditions suitable for substantial conversion of the gases into normally liquid products, essentially of aromatic and olefinic character. The hot products of reaction are then caused to impart the excess heat thereof to a charging stock suitable for thermal polymerization. The latter charging stock may be butane, a mixture of butanes, a mixture of butane and propane, a natural gas fraction containing a substantial amount of butane, or any hydrocarbon fraction consisting principally of hydrocarbons between 2 and 5 carbon atoms. The heat from the hot products of the gas pyrolysis operation may be imparted to such a charging stock by direct contact therewith or by indirect heat exchange. If the hot products are contacted directly with the cooler charging stock, the mixture is then subjected to conversion at a lower temperature suitable for thermal polymerization whereby a substantial amount of said charging stock is converted into normally liquid products essentially aliphatic in character. The reaction products from the thermal polymerization operation are then subjected, at a still lower temperature suitable for catalytic polymerization, to treatment with a catalyst whereby olefins are converted into substantially liquid products essentially of aliphatic character. It is often advantageous to contact hot products from the thermal polymerization operation with another fresh charging stock containing olefins such as a cracked gas, gases from the cracking of hydrocarbon oils, refinery gases, etc. This cooler charging stock, introduced for the purpose of catalytic polymerization of the olefin content thereof, absorbs the heat from the thermal polymerization reaction products and is, in whole or in part, raised to a temperature sufficient for catalytic polymerization.

In case the hot reaction products from the gas pyrolysis operation are passed in indirect heat exchange with the charging stock to the thermal polymerization operation, the reaction products after the indirect heat exchange may be treated to separate out products of lower boiling point than motor fuel, and the motor fuel products and lighter materials containing olefins, subjected to catalytic polymerization, preferably in a common zone, with products from the thermal polymerization operation. The final products of reaction which normally comprise those from the gas pyrolysis, thermal polymerization and catalytic polymerization operations, are treated to recover therefrom the normally liquid products, and the gaseous products are fractionated to separate a higher boiling gaseous fraction which may predominate in butane and a lower boiling hydrocarbon fraction which may predominate in propane. The propane fraction is advantageously recycle to the gas pyrolysis operation and the butane fraction recycled to the thermal polymerization operation. Such a recycle operation may be used whether or not the products from the gas pyrolysis operation are subjected to direct or indirect heat exchange with the charging stock to the thermal polymerization step.

The invention will be further described in connection with the accompanying drawing which shows diagrammatically one form of apparatus for carrying out the process of the invention.

Referring to the drawing, charging stock, such as one containing a large proportion of propane, is drawn from a source of supply, not shown, through the line 1, and forced by the pump 2, through the line 3, controlled by valve 4, to a heating coil 5, located in a furnace 6. Conditions maintained in the coil 5 are those suitable for gas pyrolysis and may be pressures of atmospheric to about 500 pounds and preferably around 100–150 pounds, and temperatures of 1250–1750° F., and preferably around 1400–1500° F. The hot products of reaction from the coil 5 are further treated in either one of two ways, and in either case it is preferable that the excess heat thereof be imparted to a charging stock for a thermal polymerization operation conducted in connection therewith. According to one method of operation, the hot products of reaction from coil 5 are conducted through the line 7 controlled by valve 8 and contacted with a fresh charging stock, such as a gas containing a large proportion of butane introduced through supply line 9. This cooler charging stock is forced by pump 10 through the line 11, controlled by valve 12 and may be contacted in the line 13 with the gas pyrolysis products at the pressure prevailing in such operation, as shown in the drawing, or after the gas pyrolysis products have been compressed to a higher pressure by means of the pump 14. It is preferable that the materials be mixed at the higher pressure when the charging stock is introduced in combination with a recycle gas which is recycled under relatively high pressure.

Although not shown in the drawing, it is to be understood that the gas pyrolysis reaction products may be subjected to a separation treatment to remove carbon or carbon and tarry materials. Such separation may be accomplished by conducting the reaction products through the branch line 15, controlled by valve 16, to a separator 17, provided with a valved draw-off line 18 at the bottom thereof. The separator 17 may be operated either as a carbon separator or for the removal of the carbon and tarry materials of higher boiling point than motor fuel. When the products from the separator are to be combined with the charging stock to the thermal polymerization operation, it is often unnecessary to remove all the materials of higher boiling point than motor fuel and it is sometimes advantageous to leave in as much of the liquid products as possible so long as carbonization is not encountered in the subsequent thermal polymerization operation. The temperature in the separator 17 may range between 500–1200° F. or higher. Gases and vapors are conducted from the top of the separator through the line 19 and may be conducted, preferably at as high a temperature as possible, through the branch line 20, controlled by valve 21, back to the charging line 13, leading to the thermal polymerization operation.

The mixture of cooler charging stock and hot products from the gas pyrolysis operation will have a temperature at some point intermediate the cooler and hot products, depending on the ratio of the two materials and on how high the temperature of the hot reaction products is at the time they are mixed with the cooler charge. In case the ratio of hot products to the cooler charge is in the region of 1:1, the temperature should be around 300–600° F. This mixture is forced by the pump 14 through the line 22 to the heating coil 23, located in a furnace 25. In this furnace additional heat is added sufficient to bring the temperature of the mixture up to about 900–1100° F. at which temperature the products are allowed to react for sufficient time, usually about 1–3 minutes and preferably around 1–2 minutes, to convert a substantial amount of hydrocarbons, particularly butane and propane hydrocarbons to normally liquid products essentially of aliphatic character. The pressure maintained in the coil 23 will be around 500–5000 pounds and preferably around 1000–2000 pounds. In the reaction taking place in the coil 23, paraffin hydrocarbons, especially butane, are polymerized to liquid products and this reaction may be substantially promoted by the products introduced therein from the gas pyrolysis operation, particularly olefins. Also this promotional effect may occur as a result of the recycling of olefins in the system as will be explained hereinafter. Also, reactions may take place in coil 23 in the nature of gas reversion whereby olefinic hydrocarbons react with paraffins such as butane or even the aromatics from the gas pyrolysis operation to form branch chain paraffins and substituted aromatic products. The reaction products from coil 23 are transferred through the line 26 to a separator 28 wherein tarry materials are precipitated and withdrawn through the valve controlled line 29 at the bottom of the separator. The uncondensed vapors and gases are conducted from the top of the separator 28 through the line 30 to catalytic chamber 32. The pressure of these gases may be reduced by means of the valve 33 to the pressure desired to be maintained in the catalytic chamber. In case the products from the gas pyrolysis operation are mixed with the charge to the gas polymerization operation, whereby the entire mixture is under the high pressure maintained in the gas polymerization operation, such high pressure may be maintained on the catalytic chamber as well as on the subsequent recovery system, whereby the recycling of gases to the system is facilitated. However, it is preferable to maintain a pressure on the catalytic chamber of around 100–500 pounds and in this case a substantial reduction in pressure on the gases charged from the gas polymerization operation is necessary.

According to one method of operation, the products from the gas pyrolysis operation, instead of being charged to the gas polymerization operation, are conducted directly to the catalytic polymerization operation. In such a type of operation the products withdrawn from the top of separator 17 through the line 19 are conducted by suitable manipulation of valve 21 in line 20 and valve 35 in line 36, so that these products may be passed through the line 36 to combine with the gas polymerization products conducted from the top of separator 28, through line 30, so that the mixture is charged through the line 38 to the catalytic chamber 32. In the latter type of operation, products introduced through the line 36 are ordinarily at a substantially lower pressure than those charged through line 30 and, therefore, a substantial reduction in pressure of the products in line 30, by means of valve 33, is necessary. It is to be understood that all or a portion of the gas pyrolysis products from the separator 17 may be charged through line 36 to the catalytic process. In case all of the products are conducted directly to the catalytic polymerization operation, it is desirable that the charging stock to the gas polymerization operation, be passed in indirect heat exchange with the hot gas pyrolysis reaction products discharged through line 15 to the separator 17. This may be done by charging the fresh feed through line 9a instead of 9 and forcing the feed by means of pump 10a through line 11a in which is located the heat exchangers 54 and 55.

An advantageous method of operation is to charge additional fresh stock containing a substantial amount of olefins, such as cracked hydrocarbon gases, cracking still gases, or refinery gases, through the line 40, and force them by means of the pump 41 through the valve controlled line 42 and branch line 43 to the line 38 leading to the catalyst chamber 32. While only one catalyst chamber is shown, it will be understood, of course, that any number may be used continuously or intermittently. The hot products in the line 38 from the previous operations will impart heat to the cooler fresh charging stock so that a charging mixture of suitable temperature for the catalytic polymerization operation may be obtained. The hot products in the line 38 may be at a temperature from about 500–900° F., usually around 700–800° F. and sufficient cool charge is mixed therewith so that the temperature of the mixture will be around 400–500° F. This temperature of the mixture may be attained by regulating the amount of cool charge introduced through the lines 40, 42 and 43, or, if necessary, some method of heat control may be installed in the line 38.

The catalyst chamber 32 contains a suitable catalyst for polymerizing olefins to normally liquid products essentially aliphatic in character. A suitable catalyst for this purpose is phosphoric acid, which may be deposited on a suitable carrier or, it may be mixed with other materials such as zinc or aluminum oxides, and the mixture deposited on a carrier, such as fuller's earth.

The conditions maintained in the catalyst chamber may be around 300–600° F., preferably around 400–500° F. and pressures of about 100 pounds or higher. The reaction products from the catalyst chamber 32 are conducted from the bottom thereof through the line 44 to a fractionator 45. In this fractionator, normally liquid hydrocarbons are condensed and withdrawn from the bottom thereof through the valve controlled line 46 as a polymer naphtha which may be used for motor fuel. This naphtha usually requires fractional distillation and chemical treatment to produce a finished gasoline which may be used either alone or for blending purposes. The product is usually of high antiknock character and contains a substantial amount of aromatics in addition to high antiknock aliphatic hydrocarbons, and is, of course, a combination of products obtained by gas pyrolysis, thermal polymerization and catalytic polymerization. It is of high unsaturated content and ordinarily the product can be made sufficiently stable by chemical treatment or vapor phase clay treatment although in some cases hydrogenation may be advantageous.

The gaseous products are removed from the top of fractionator 45 through the line 47 and introduced into the fractionator 48. These gases are usually relatively low in unsaturated content and appreciably lower than ordinarily obtained from a gas pyrolysis or a thermal polymerization operation, due to the fact that these gases have been treated in a catalytic polymerization operation. The gases are fractionated in the fractionator 48 to separate the uncondensable hydrocarbons, such as hydrogen, methane and some ethylene and ethane, which are released from the top of the fractionator through the valve controlled line 50. The remaining gases, between those released from line 50 and the polymer naphtha removed from the bottom of the fractionator 45 through the line 46, are fractionated into a lower boiling hydrocarbon fraction and a higher boiling hydrocarbon fraction. The higher boiling hydrocarbon fraction containing a large proportion of butane, for example, is drawn from the bottom of the fractionator 48 through the line 51 and recycled by means of the pump 53 and line 54 to the thermal polymerization operation. The lower boiling hydrocarbon fraction is withdrawn from an intermediate point of the fractionator 48 through the line 56 and recycled by means of pump 57 and line 58 to the gas pyrolysis operation. In some cases, particularly if a substantial amount of olefins remains in the recycle gases, these products may be recirculated to the catalytic polymerization operation by means of branch lines 60 and 61 connected with line 43. It is to be understood that any part or all of these recycle gases may be separately or simultaneously conducted by means of these branch lines to the catalytic polymerization operation. It is also contemplated that only one fraction may be withdrawn from the fractionator 48, for example through the line 51 and this material charged, all or in part, to either the thermal polymerization or the catalytic polymerization operation.

As an example of the operation of the invention, a gas consisting chiefly of propane, comprising about 2 parts of fresh charge to one part of recycle stock, is subjected to a temperature of about 1450° F. for sufficient time to convert a substantial amount of the gases into aromatics and olefins. The carbon was separated from the reaction products and while hot is thereafter mixed with a cooler hydrocarbon gas in about equal proportions. The cooler gas consisted of a fresh feed containing a large proportion of butane and about 25% of recycle stock, predominating in butane. A mixture of fresh feed, recycle stock and reaction products from the gas pyrolysis operation, having a temperature of about 500° F., is subjected to thermal polymerization under pressure of about 800 pounds and a temperature of about 1050° F. for sufficient time to convert a substantial amount of butane hydrocarbons into normally liquid products essentially aliphatic in character. The reaction products from the thermal polymerization operation are fractionated to remove the tarry materials and the higher boiling point than motor fuel and the uncondensed vapors and gases are subjected to catalytic polymerization at a temperature of about 450° F. and a pressure of about 150 pounds in the presence of phosphoric acid on silica gel. The reaction products from the catalytic polymerization are subjected to fractionation to separate the normally liquid products as a polymer naphtha. The gases are subjected to fractionation to remove the hydrogen and methane and also fractionated to separate a lower boiling hydrocarbon gas, chiefly propane, which is recycled to the gas pyrolysis operation, and a higher boiling fraction predominating in butane which is recirculated to the thermal polymerization step. The yield of polymer gasoline is around 65%.

As another example of the operation of the invention, a charging stock consisting chiefly of propane was subjected to gas pyrolysis under conditions specified above, and the reaction products passed in indirect heat exchange with another charging stock containing a large proportion of butane, whereby the butane is preheated to around 600° F. and then subjected to thermal polymerization. The products from the thermal polymerization operation are treated to separate the tars and then mixed with about 50% of cracking still gases and the mixture, at a temperature of about 450–500° F., is subjected to catalytic polymerization in the presence of a catalyst containing phosphoric acid. The products from the thermal polymerization were fractionated to separate the polymer gasoline and a gaseous fraction which, after the removal of methane and hydrogen, is separated into two cuts, one largely propane which is recycled to the gas pyrolysis step and the other butane which is recycled to the thermal polymerization operation. About 55% of polymer gasoline, largely of aliphatic character, and about 15% of naphtha, consisting chiefly of aromatics, were recovered from the operations.

The process of the present invention is advantageous where various types of hydrocarbon gases are available for treatment. The process is flexible and adapted to treat gases such as propane, butane or cracked gases in any ratio and under optimum conditions to produce a maximum yield of polymer liquid products. The process is also efficient particularly in the conservation of heat in that selected fractions of the gases are treated at successively lower temperatures in the order of the ease of conversion and those treated at the lower temperatures utilize the excess heat of the hot reaction products from the higher temperature operations.

Obviously many modifications and variations of the invention, as hereinbefore set forth, may be made without departing from the spirit and scope thereof, and therefore only such limitations should be imposed as are indicated in the appended claims.

I claim:
1. A process for the conversion of normally gaseous hydrocarbons into normally liquid hydrocarbons, which comprises subjecting hydrocarbon gases, containing a substantial amount of paraffin hydrocarbons between methane and butane, while under a pressure between atmospheric and about 500 pounds, to temperatures of about 1250–1750° F. whereby aromatics and olefins are formed, contacting with the hot products of reaction a cooler hydrocarbon gas containing a large proportion of butanes, subjecting the mixture to thermal polymerization under pressures of about 500–5000 pounds and temperatures of about 900–1100° F. for sufficient time to effect substantial formation of normally liquid hydrocarbons essentially aliphatic in character, then subjecting the resulting mixture to a catalytic polymerization at temperatures of 300–600° F. and separating the normally liquid hydrocarbons from the products of reaction.

2. A process for the conversion of normally gaseous hydrocarbons into normally liquid hydrocarbons, which comprises subjecting hydrocarbon gases containing a substantial amount of propane to gas pyrolysis at temperatures of about 1250–1750° F. and pressures of atmospheric to about 500 pounds, whereby aromatics and olefins are formed, contacting the hot products of reaction with cooler hydrocarbon gases containing a substantial amount of butanes and subjecting the mixture to thermal polymerization at pressures of about 500–5000 pounds and temperatures of about 900–1100° F., whereby normally liquid hydrocarbons are formed essentially aliphatic in character, contacting the products of reaction with cooler hydrocarbon gases containing a substantial amount of olefins and subjecting the latter mixture to catalytic polymerization at temperatures of about 300–600° F. and separating the normally liquid hydrocarbons from the final products of reaction.

3. A process for the conversion of normally gaseous hydrocarbons to normally liquid hydrocarbons, which comprises subjecting hydrocarbon gases mainly of lower molecular weight than butane to gas pyrolysis conditions of pressures of atmospheric to about 500 pounds and temperatures of about 1250–1750° F. for sufficient time to form aromatics and olefins, separating tar and carbon from the reaction products, contacting the remaining products of reaction with hydrocarbon gases containing considerable butane and subjecting the resulting mixture to thermal polymerization under pressures of about 500–5000 pounds and at temperatures of about 900–1100° F., separating tars from the latter products of reaction and contacting therewith cracked hydrocarbon gases, subjecting the latter mixure to catalytic polymerization in the presence of a catalyst and at temperatures of about 300–700° F. and separating the normally liquid hydrocarbons from the combined reaction products.

4. A process for the conversion of normally gaseous hydrocarbons into normally liquid hydrocarbons, which comprises subjecting hydrocarbon gases chiefly of lower molecular weight than butane to gas pyrolysis under pressures of atmospheric to 500 pounds and temperatures of about 1250–1750° F. to produce aromatics and olefins, separating from the products of reaction materials less volatile than motor fuel, simultaneously subjecting hydrocarbon gases consisting chiefly of butane to thermal polymerization under pressures of about 500–5000 pounds and temperatures of 900–1100° F., separating from the latter products of reaction tarry materials, combining the lighter materials from both the gas pyrolysis and the gas polymerization operations and subjecting the mixture to catalytic polymerization at temperatures of about 300–600° F. and pressures of 100–500 pounds, and separating from the final products of reaction the normally liquid hydrocarbons.

5. A process according to claim 4 in which there is also separated from the final products of reaction a higher boiling gaseous fraction predominating in butane and a lower boiling gaseous fraction predominating in propane and the higher boiling fraction recycled to the thermal polymerization operation and the lower boiling fraction recycled to the gas pyrolysis operation.

6. A process for the conversion of normally gaseous hydrocarbons to normally liquid hydrocarbons, which comprises subjecting gaseous hydrocarbons predominating in constituents of lower molecular weight than butane to pyrolysis temperatures sufficiently high to effect substantial conversion thereof into olefins and aromatics, also subjecting gaseous hydrocarbons containing a substantial amount of butane to thermal polymerization under conditions of pressure and temperature whereby a substantial amount of liquid hydrocarbons of aliphatic character is formed, separating high boiling liquids from the products of reaction of the pyrolysis and polymerization operations, commingling the low boiling liquids and polymerizable gaseous olefins in the remaining products of reaction and subjecting the mixture to a catalytic polymerization operation, and recovering liquid hydrocarbon polymers from the products of said catalytic polymerization operation.

7. A process for the conversion of normally gaseous hydrocarbons to normally liquid hydrocarbons which comprises subjecting gaseous hydrocarbons predominating in constituents of lower molecular weight than butane to pyrolysis temperatures sufficiently high to effect substantial conversion thereof into aromatics and olefins, separating from the products of reaction materials less volatile than motor fuel, simultaneously subjecting hydrocarbon gases predominating in butanes to thermal polymerization under conditions of temperature and pressure whereby a substantial amount of liquid hydrocarbons essentially of aliphatic character is formed, separating tarry materials from the resulting products of reaction, combining the lighter materials from both the pyrolysis and thermal polymerization operations, subjecting the resulting mixture to catalytic polymerization and recovering a liquid polymer from the products of said catalytic polymerization operation.

8. A process according to claim 7 in which extraneous cracked gaseous hydrocarbons are introduced into the mixture subjected to the catalytic polymerization operation.

LE ROY G. STORY.